(12) United States Patent
Nelsen et al.

(10) Patent No.: US 7,540,195 B2
(45) Date of Patent: Jun. 2, 2009

(54) ELECTRO-SHAKER VEHICLE TEST STAND

(75) Inventors: Scott J. Nelsen, Avondale, AZ (US); Stephen L. Robertson, Surprise, AZ (US); Graham J. Fotheringham, Avondale, AZ (US); George J. Vankaam, Buckeye, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 190 days.

(21) Appl. No.: 11/534,894

(22) Filed: Sep. 25, 2006

(65) Prior Publication Data

US 2008/0078250 A1    Apr. 3, 2008

(51) Int. Cl.
*G01M 7/04* (2006.01)
*G01M 17/04* (2006.01)

(52) U.S. Cl. .......................................... 73/669; 73/666
(58) Field of Classification Search ................... 73/669, 73/663, 666, 668
See application file for complete search history.

(56) References Cited

U.S. PATENT DOCUMENTS

| | | | |
|---|---|---|---|
| 1,808,596 A | 6/1931 | Dainos | |
| 2,141,639 A | 12/1938 | Catalano | |
| 2,890,584 A | 6/1959 | Dickie | |
| 3,293,906 A | 12/1966 | Holzman | |
| 3,877,288 A | * 4/1975 | Schiefen | ...................... 73/669 |
| 4,689,998 A | 9/1987 | Jackson et al. | |
| 5,644,087 A | 7/1997 | Liu | |
| 6,474,167 B1 | 11/2002 | Priem | |

FOREIGN PATENT DOCUMENTS

| | | |
|---|---|---|
| JP | 57-147028 | 9/1982 |
| JP | 62-088933 | 4/1987 |
| JP | 01257237 | 10/1989 |
| JP | 04315937 | 11/1992 |

\* cited by examiner

*Primary Examiner*—John E Chapman
(74) *Attorney, Agent, or Firm*—Gifford, Krass, Sprinkle, Anderson & Citkowski, P.C.

(57) ABSTRACT

An electro-shaker vehicle test stand for vehicle evaluation includes a support frame, an electro-shaker mechanism and an interconnecting lever arm. The lever arm has an adjustable length. The test stand includes a spring table having a spring table plate and a spring table frame that is parallel to and spaced a predetermined distance below the spring table plate, a guide rod having a lower end attached to the spring table frame and an upper end attached to the spring table plate and a spring having an upper end attached to the frame and a lower end attached to the spring table frame. Activation of the electro-shaker mechanism induces an oscillatory movement of the spring in a vertical direction so that the spring table and vehicle are correspondingly displaced in a vertical direction.

20 Claims, 5 Drawing Sheets

ELECTRO-SHAKER VEHICLE TEST STAND

BACKGROUND OF THE INVENTION

1. Field of the Invention

The present invention relates generally to vehicle test equipment, and more specifically, to an electro-shaker vehicle test stand for static evaluation of vehicle road performance.

2. Description of the Related Art

Vehicles, such as motor vehicles, are complex structures that include a multitude of interrelated components. During the development of a vehicle, the vehicle will undergo various tests to predict the durability and reliability of the vehicle under various conditions over a period of time, and in particular, under actual driving conditions. While the vehicle may be tested dynamically using actual roads, this evaluation technique is time consuming and expensive to perform. Therefore, static evaluation techniques have been developed that simulate driving on a particular road surface, and correlate with dynamic vehicle test results. An example of a type of predictive static vehicle test is a shake test that simulates driving conditions in order to measure the ride and handling characteristics of the vehicle.

Various types of test stands are known in the art for performing a static vehicle road performance evaluation. One example of a test fixture includes a support frame attached to a hydraulic shaker. While this type of shaker works well in simulating road conditions, it has several inherent disadvantages. Hydraulic shakers are large machines that require significant space, in part due to the size of the oil reservoir. In addition, this type of test stand is expensive to manufacture and operate. Further, this type of test stand is not portable or adaptable to other types of tests. Thus, there is a need in the art for a vehicle test stand that can support the load of a vehicle while simulating a driving surface, and at the same time is cost effective to manufacture and operate.

SUMMARY OF THE INVENTION

Accordingly, the present invention is an electro-shaker test stand for evaluation of a vehicle. The electro-shaker test stand includes a support frame and an electro-shaker mechanism. A lever arm is disposed between the electro-shaker mechanism and the support frame. The lever arm has a length that is adjustable and a first end of the lever arm is connected to the electro-shaker mechanism and a second end of the lever arm is connected to the support frame. The electro-shaker test stand includes a spring table having a spring table plate and a spring table frame that is parallel to and spaced a predetermined distance below the spring table plate. A guide rod is included that has a lower end attached to the spring table frame and an upper end attached to the spring table plate. The electro-shaker test stand further includes a spring having an upper end attached to the frame and a lower end attached to the spring table frame. In operation, activation of the electro-shaker mechanism induces an oscillatory movement of the spring in a vertical direction so that the spring table and vehicle are correspondingly displaced in a vertical direction.

One advantage of the present invention is that an electro-shaker vehicle test stand is provided that statically evaluates vehicle performance under simulated road driving conditions. Another advantage of the present invention is that the test stand includes a spring table that supports the mass of the vehicle. Still another advantage of the present invention is that the test stand includes a lever arm drive system that multiplies the force of the electro-shaker to provide the necessary combination of force and displacement. Yet another advantage of the present invention is that the test stand is easily adaptable to various vehicles. A further advantage of the present invention is that the test stand is portable. Still a further advantage of the present invention is that the test stand is cost effective to manufacture and operate.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
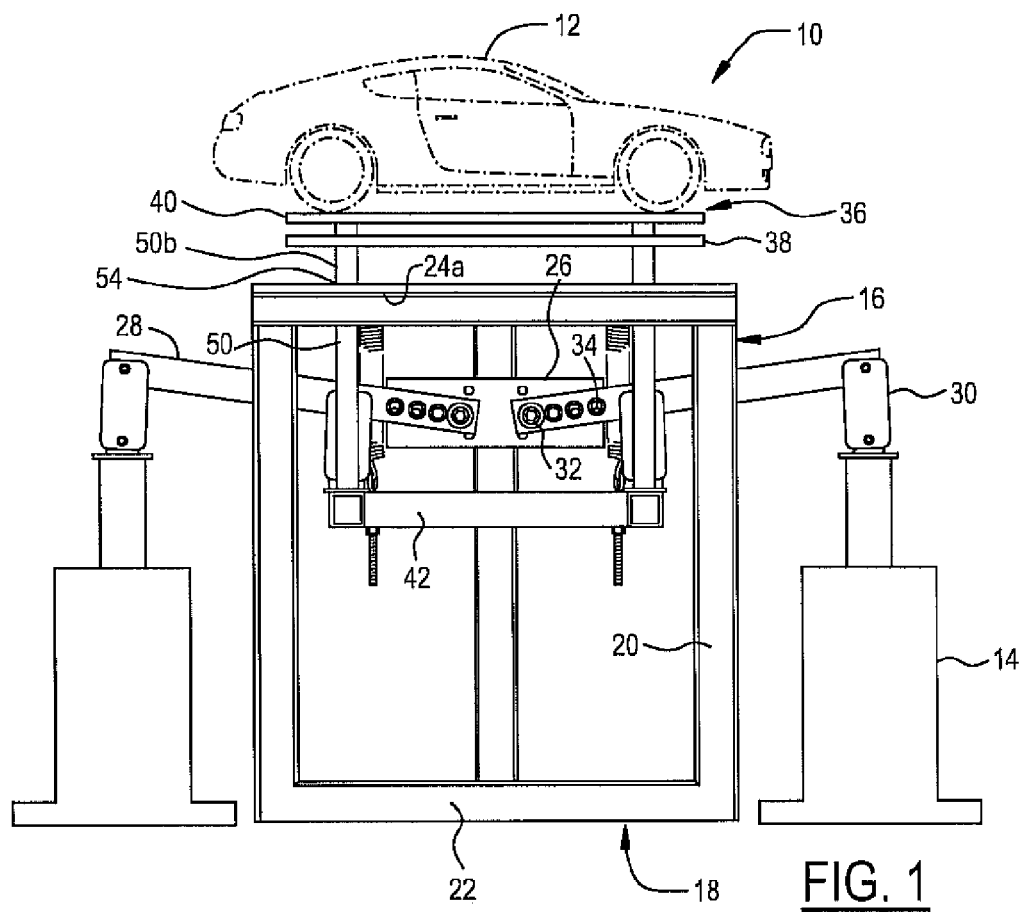
FIG. 1 is an elevational view of an electro-shaker vehicle test stand, according to the present inventions.
Figure 3:
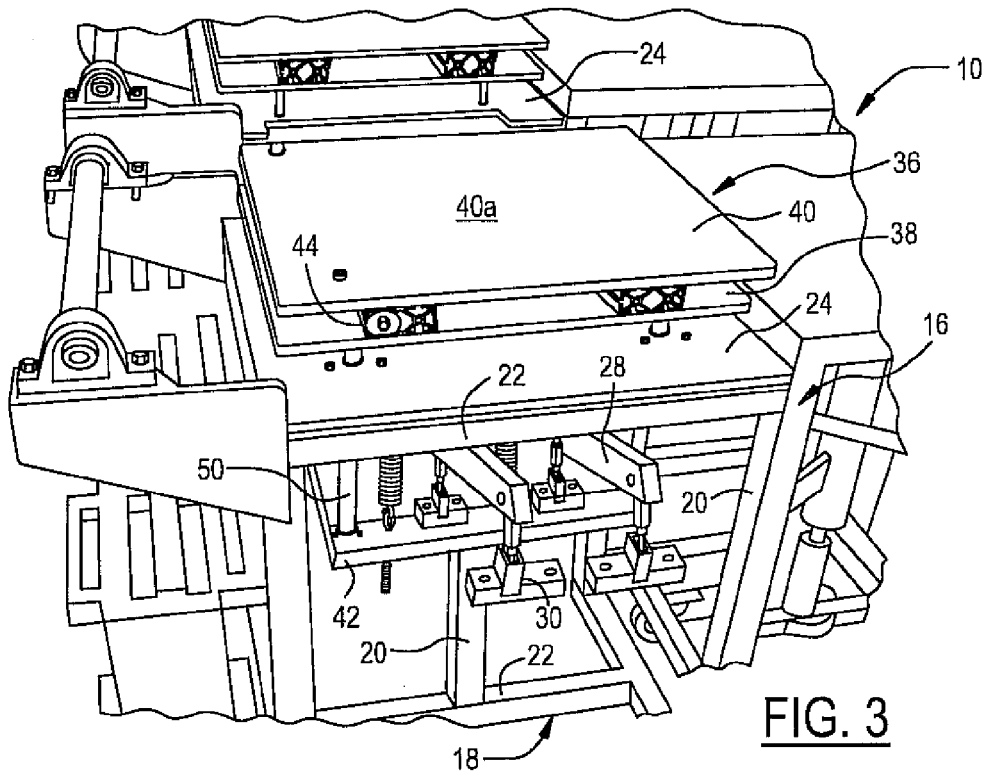
FIG. 3 is a top view of the electro-shaker vehicle test stand of FIG. 1, according to the present inventions.
Figure 2:
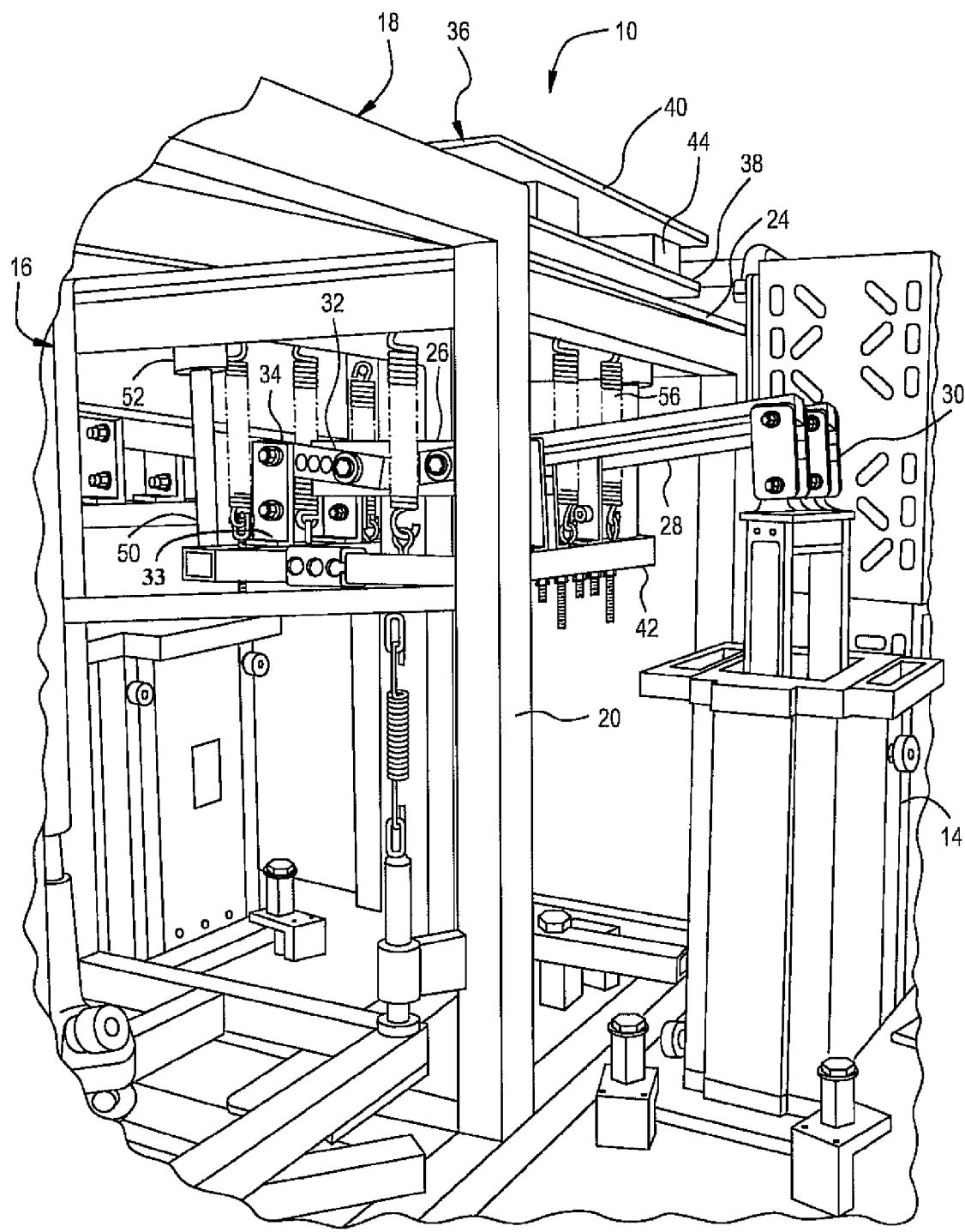
FIG. 2 is a partial perspective view of the electro-shaker vehicle test stand of FIG. 1, according to the present inventions.
Figure 4:
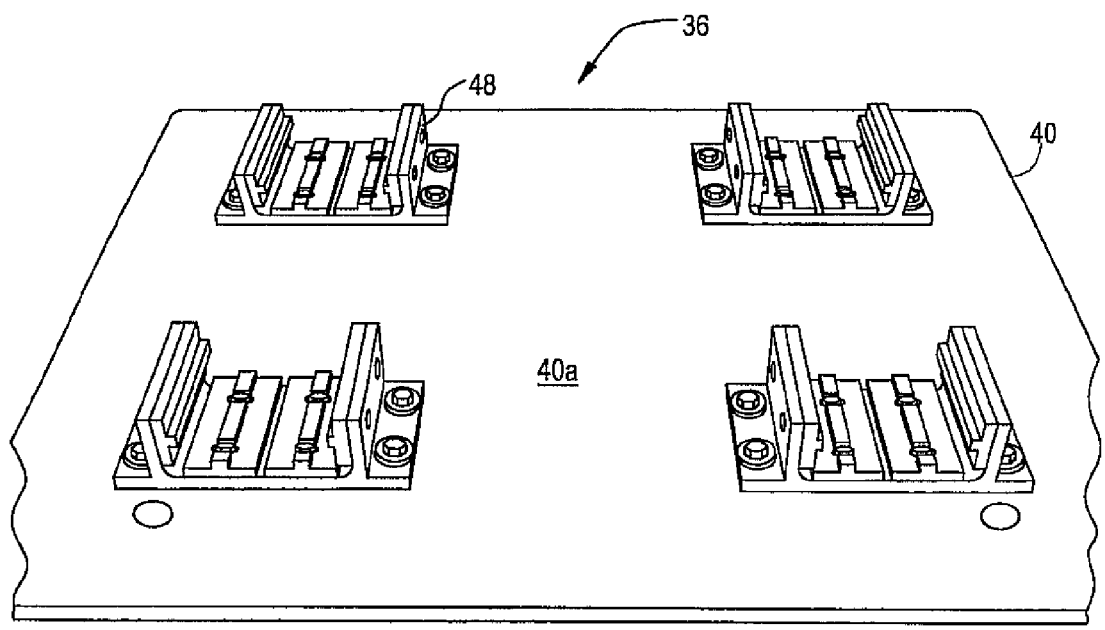
FIG. 4 is a perspective view of the lower surface of the upper spring table plate for the electro-shaker vehicle test stand of FIG. 1, according to the present inventions.
Figure 5:
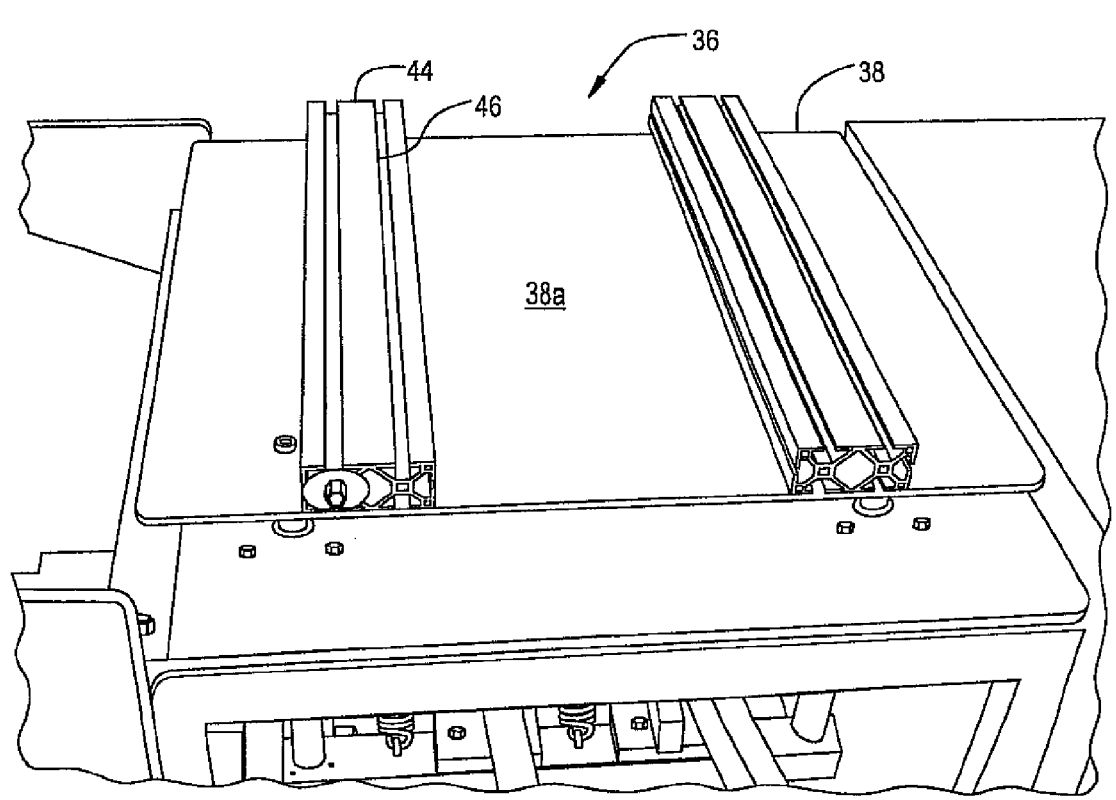
FIG. 5 is a perspective view of the upper surface of the lower spring table plate for the electro-shaker vehicle test stand of FIG. 1, according to the present inventions.
Figure 6:
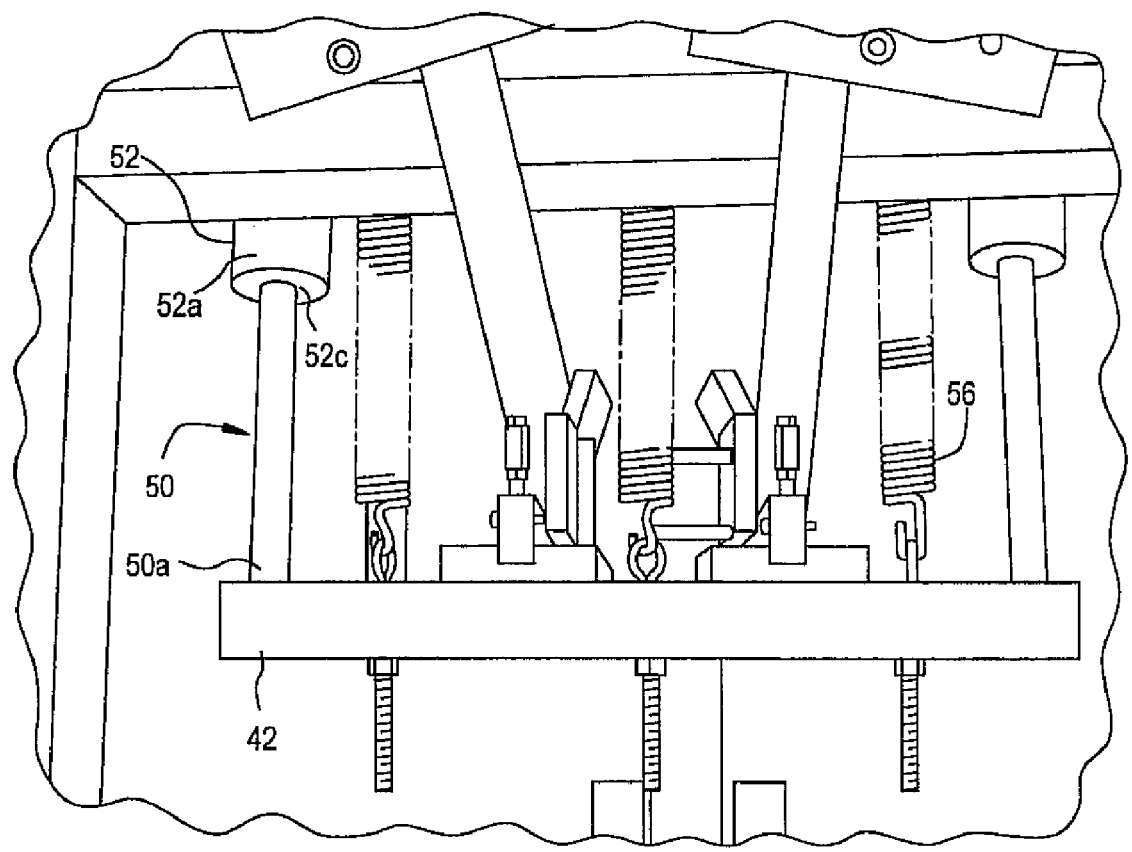
FIG. 6 is a partial elevational view of the spring table for the electro-shaker vehicle test stand of FIG. 1, according to the present inventions.
Figure 7:
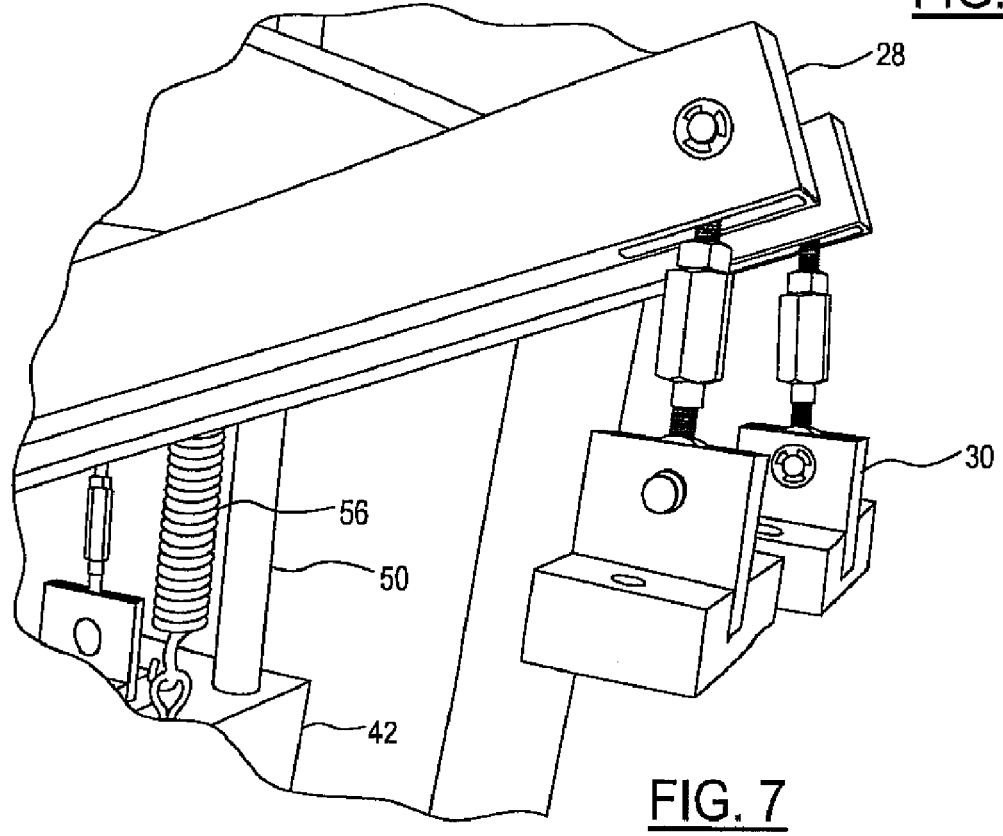
FIG. 7 is a perspective view of the attachment of the electro-shaker to the lever arm for the electro-shaker vehicle test stand of FIG. 1, according to the present inventions.
Figure 8A:
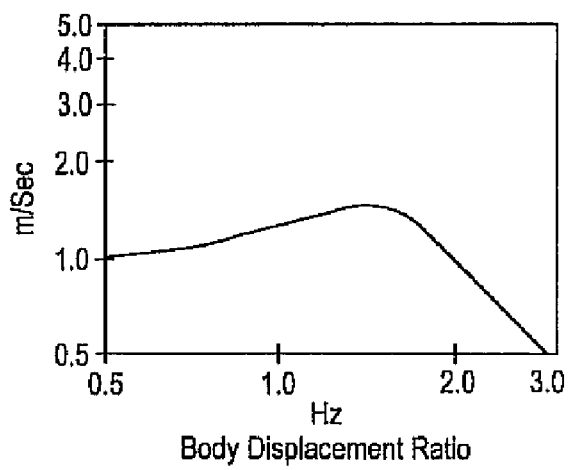
FIG. 8a-8c are graphs illustrating results of a ride comfort vehicle test using the electro-shaker test stand of FIG. 1, according to the present inventions.
Figure 8B:
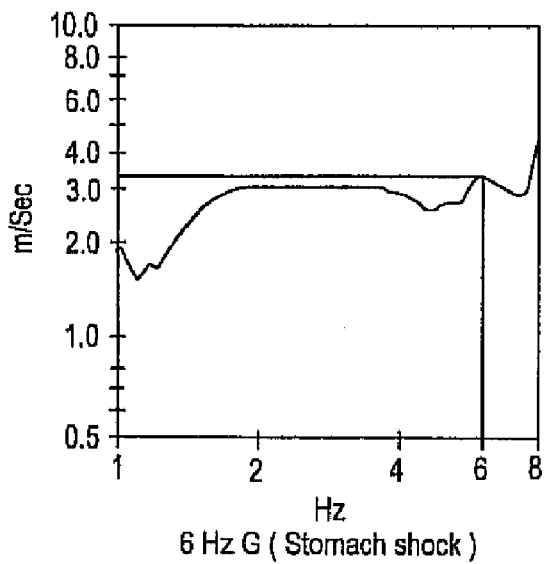
Figure 8C:
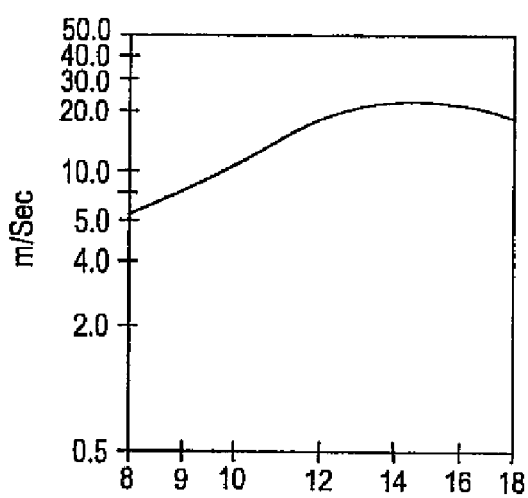

Referring to FIG. 1-7, an electro-shaker test stand system 10 for use with a vehicle 12 is illustrated. The electro-shaker test stand system 10 includes an electro-shaker mechanism 14 that provides a vertical input in the form of an amplitude and frequency to a spring table. The spring table supports the vehicle 12. It should be appreciated that the vertical input can be utilized to simulate the effect of a road surface on the vehicle 12, and may be applied to one, or more tires. The electro-shaker system 10 can be utilized for a variety of vehicle tests, such as ride and handling, or tire performance, or the like. The results from a ride and handling performance evaluation are shown in FIG. 8a-8c.

The electro-shaker test system 10 includes a support frame 16. The support frame 16 includes a plurality of integral support members 18 positioned to provide a support for the spring table and the vehicle 12. In this example the support frame 16 has a generally boxlike shape. It should be appreciated that in this example there are five support columns 20, including four outer support columns 20, and an inner center support column 20. The support frame 16 also includes interconnecting support members 22 for connecting together the support columns 20. Further, in this example a lower interconnecting support member interconnects the lower edges of the support columns, and another upper interconnecting support member interconnects the upper edges of the support columns 20. The support frame 16 is made from a durable material, such as steel. The support frame 10 also includes a support frame plate 24, which is a generally planar member attached to an upper surface of the upper interconnecting support members 22 and the support columns 20. In this example, there are two adjacent support frame plates 24. The frame configuration, including the columns, lower interconnecting support members 22, upper interconnecting support members 22 and support frame table 24, are selected with the size of the vehicle 12 as a consideration.

The electro-shaker test stand system 10 includes an electro-shaker mechanism 14 that imparts a repetitive vertical input to a spring table (to be described). An example of an electro-shaker mechanism 14 is a model 400 electro-shaker manufactured by APS. The electro-shaker mechanism includes a controller which controls the output of the device in terms of amplitude and frequency. In this example there are two electro-shaker mechanisms 14, each positioned adjacent a side of the support frame 16. A typical output is 500 N per electro-shaker mechanism.

The electro-shaker test stand system 10 includes a fulcrum 26 fixedly attached to the center support column 20. In this example, the fulcrum 26 is bolted to the center support column 20, although other types of attachment are contemplated. The fulcrum 26 operatively trades a displacement for a force. In this example, the fulcrum 26 is a generally planar member, and is made from a material such as steel or aluminum or the like.

The electro-shaker test stand system 10 includes a lever arm 28 interconnecting the electro-shaker mechanism 14 and the fulcrum 26. In this example the lever arm 28 forms a class 2 lever system. Also, in this example, the lever arm 28 is a generally planar bar made from a material such as aluminum, although other materials are contemplated.

A first end of the lever arm 28 is operatively connected to the electro-shaker mechanism 14 using a link member 30. By way of example, the link member 30 is a turnbuckle, although other types of link members having an adjustable length would likewise be suitable. The second end of the lever arm 28 is attached to the fulcrum 26 at a pivot point 32 that is adjustable. In this example, the second end of the lever arm 28 includes a plurality of adjustment apertures 34, and the length of the lever arm 28 is determined by the selection of the adjustment aperture 34 used to connect the lever arm 28 to the fulcrum 26. It should be appreciated that a consideration for the selection of the lever arm pivot point 32 and resulting effective lever arm is the force output of the electro-shaker mechanism 14, as well as the vehicle mass. It may be desirable to maximize the force output to decrease the displacement of the spring table. The lever arm 28 operatively multiplies the force of the electro-shaker mechanism 14, in order to move the vehicle 12 vertically. By changing the pivot point 32 location, a predetermined combination of force and displacement may be achieved. In this example, there are four lever arms, two per side. Additionally, the lever arm 28 is connected to the spring table frame 42 by a bracket 33, best seen in FIG. 2.

The electro-shaker test stand system 10 includes a spring table 36 that is operatively connected to the support frame 16 in a manner to be described. The spring table functionally supports the vehicle 12 in a manner to be described. The spring table 36 includes a lower spring table plate 38 that is attached to an upper spring table plate 40 that is parallel to and spaced a predetermined distance apart from the lower spring table 38. The lower spring table plate 38 and upper spring table plate 40 are positioned above the support frame plate 24. The spring table 36 also includes a spring table frame 42 parallel to and spaced a predetermined distance below the lower spring table plate 38. In this example, the spring table frame 42 includes four bars having a generally rectangular configuration. The spring table frame 42 is positioned below the upper support frame table 24.

The upper spring table plate 40 provides a generally planar support surface for the vehicle. In this example, the vehicle rests freely on an upper surface 40a of the upper spring table plate 40, to simulate actual vehicle road interface conditions. The upper spring table plate 40 is a generally planar member, and in this example there are two adjacent upper spring table plates 40 to support the front half and rear half of the vehicle respectively. The lower spring table plate 38 is also a generally planar member and in this example there are two adjacent lower spring table plates 38 corresponding to the upper spring table plates 40.

The lower spring table plate 38 includes two tracks 44 attached to an upper surface 38a of the lower spring table plate 38. The tracks 44 are parallel to each other and spaced a predetermined distance apart, such as 50 mm. Each track 44 includes a longitudinally extending channel 46 for receiving a guide member 48, such as a bushing, that is attached to a lower surface 40b of the upper spring table 40. In this example the bushing is made of nylon, and the track is an extruded aluminum rail. The shape of an outer surface of each guide member is complementary to a shape of the adjustment track channel 40.

The guide member 48 is slidingly engaged within the adjustment track channel 46, so that the upper spring table plate 40 can move in a fore-aft direction with respect to the lower spring table plate 38. Therefore, the upper spring table plate 40 moves relative to the lower spring table plate 38 as a result of the travel of the bushing 48 within the adjustment track channel 46. The sliding movement of the upper spring table plate 40 relative to the lower spring table plate 38 is a result of the lateral movement of the vehicle 12 that occurs during placement of the vehicle 12 on the electro-shaker test stand 10. The vehicle may move laterally during a particular test, but such movement is usually small due to the friction between the bushing and the track 44.

It should be appreciated that most vehicles experience a camber change as the wheel travels from a fully extended to a loaded condition. Since that travel is arcuate, the tread width of the tire changes. It should be appreciated that the upper spring table plate 40 slides with respect to the lower spring table plate 38, to allow the vehicle tire tread width to change as the vehicle is lowered onto the spring table 36.

The spring table 36 also includes a plurality of guide rods 50 interconnecting the spring table frame 42 and lower spring table plate 38. The guide rods 50 are tubular members. In this example, a lower end 50a of the guide rod 50 is fixedly connected to the spring table frame 42, such as by bolting or the like. An upper end 50b of the guide rod 50 is operatively connected a lower surface 38b of the lower spring table plate 38, such as by bolting. The guide rod is disposed within a linear guide member 52 that is operatively attached to a lower surface 24a of the support frame plate 24. The linear guide member 52 has a generally planar support surface 52, and a cylindrically shaped guide portion 52a extending radially from the support surface. The guide portion 52b has a longitudinally extending central bore 52c. The guide rod extends therethrough the linear guide member 52 and a corresponding aperture 54 in the support frame plate 24. In this example there are four guide rods, each positioned to support a corner edge of the lower spring table plate 38. The guide rods 50 move up and down through a vertical displacement, as a result of the shaking movement provided by the electro-shaker mechanism 14. The linear guide member insures that the shaker motion is completely vertical, and reduces any horizontal or fore-aft movement of the spring table 36 due to shaking.

The spring table 36 further includes a plurality of spring members 56. A lower end of the spring member is attached to the spring table frame 42, and the upper end of the spring member 56 is attached to the support frame plate 24. An example of a spring member 56 is an extension spring. The extension spring 56 transmits the vertical motion of the electro-shaker mechanism 14 to the vehicle 12 through the interconnected lower spring table plate 38 and upper spring table plate 40. In this example, there are eight spring members. It should be appreciated that the spring table frame 42 is connected to the upper and lower spring table plates 40, 38 and guide rods 50. The springs 56 bear the weight of the vehicle 12, and the number of springs may be varied depending on the weight of the vehicle. Advantageously, the electro-shaker mechanism 14 moves against the force of the spring 56 and not the mass of the vehicle 12.

In operation, the length of the lever arm or location of the lever arm pivot point 32 is adjusted to accommodate a mass of a particular vehicle. The vehicle 12 is positioned on the upper surface 40*a* of the upper spring table plate 40. The electro-shaker mechanism 14 is activated to impose a predetermined vertical oscillation to the spring table 36 via the lever arms 28. As previously described, the frequency and amplitude of the vertical oscillation can be varied. The vertical oscillation is transmitted via the springs 56, so that the guide rods 50, spring table frame 42, lower spring table plate 38, upper spring table plate 40 and the vehicle all move together through a vertical displacement.

Since lever arms 28 are adjustable, increasing the frequency of the movement increases the force required from the shakers using the equation $F=mA(2\pi f)^2$. For example, increasing the frequency from 8 Hz to 20 Hz increases the acceleration by 6.25 times. During a typical test, the displacement is ±10 mm. The upward motion is generally limited by the free length of the spring, such as 20-25 mm with the vehicle in place. The downward motion of the spring table is dependent on factors such as the initial spring rate, and may be in the range of 15-20 mm.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An electro-shaker vehicle test stand for evaluation of a vehicle comprising:
    a support frame;
    an electro-shaker mechanism;
    a lever arm disposed between said electro-shaker mechanism and said support frame, wherein said lever arm has an adjustable length and a first end of said lever arm is connected to said electro-shaker mechanism and a second end of said lever arm is connected to said support frame utilizing a bracket;
    a spring table having a spring table plate and a spring table frame that is parallel to and spaced a predetermined distance below said spring table plate,
    a guide rod having a lower end attached to said spring table frame and an upper end attached to said spring table plate; and
    a spring having an upper end attached to said support frame and a lower end attached to said spring table frame, wherein activation of said electro-shaker mechanism induces an oscillatory movement of said spring in a vertical direction, so that said spring table and vehicle are correspondingly displaced in a vertical direction.

2. The electro-shaker test stand of claim 1, wherein said support frame includes a plurality of interconnected support members having a boxlike shape.

3. The electro-shaker test stand of claim 2 wherein said support members include:
    a center support column and a plurality of outer support columns;
    a lower interconnecting support member interconnecting lower edges of said outer support columns;
    an upper interconnecting support member interconnecting upper edges of said outer support columns; and
    a generally planar support frame plate positioned on top of said upper interconnecting support member.

4. The electro-shaker test stand of claim 3 further comprising a fulcrum fixedly attached to said center support column, wherein said fulcrum is a generally planar member and said lever arm is attached to said fulcrum at a lever arm pivot point.

5. The electro-shaker test stand of claim 4, wherein said lever arm includes a plurality of adjustment apertures for adjusting a length of said lever arm.

6. The electro-shaker test stand of claim 3, wherein said spring table plate further comprises:
    an upper spring table plate having an upper surface for supporting the vehicle and a lower surface with a guide member attached thereto;
    a lower spring table plate having an upper surface and a lower surface, wherein said lower spring table plate is attached to said upper spring table plate, and is parallel to and spaced a predetermined distance from the upper spring table plate; and
    a track attached to an upper surface of said lower spring table plate, wherein said track includes a longitudinally extending channel for receiving the spring table guide member, to sliding adjust a position of said upper spring table plate with respect to said lower spring table plate when said vehicle is placed on said upper spring table plate.

7. The electro-shaker test stand of claim 3 further comprising a linear guide member attached to a lower surface of said support frame plate, wherein said liner guide member includes a guide portion having longitudinally extending bore, and said guide rod is slidingly disposed within the bore in said guide member and through an aperture in said support frame.

8. The electro-shaker test stand of claim 1 further comprising an adjustable link member interconnecting said lever arm with said electro-shaker mechanism.

9. The electro-shaker test stand of claim 1, wherein said spring is an extension spring.

10. An electro-shaker vehicle test stand for evaluation of a vehicle comprising:
    a support frame formed by a plurality of interconnected support members, wherein said support frame has a boxlike shape;
    an electro-shaker mechanism;
    a fulcrum fixedly attached to said support frame, wherein said fulcrum is a generally planar member;
    a lever arm disposed between said electro-shaker mechanism and said support frame, wherein said lever arm has an adjustable length, and a first end of said lever arm is connected to said electro-shaker mechanism and a second end of said lever arm is connected to said support frame utilizing a bracket;

a spring table having a spring table plate and a spring table frame that is parallel to and spaced a predetermined distance below said spring table plate, a guide rod having a lower end attached to said spring table frame and an upper end attached to said spring table plate; and a spring having an upper end attached to said support frame and a lower end attached to said spring table frame, wherein activation of said electro-shaker mechanism induces an oscillatory movement of said spring in a vertical direction so that said spring table and vehicle are correspondingly displaced in a vertical direction.

11. The electro-shaker test stand of claim 10 wherein said support members include:

a center support column and a plurality of outer support columns;

a lower interconnecting support member interconnecting lower edges of said outer support columns;

an upper interconnecting support member interconnecting upper edges of said outer support columns; and a generally planar support frame plate positioned on top of said upper interconnecting support member.

12. The electro-shaker test stand of claim 11 further comprising a linear guide member attached to a lower surface of said support frame plate, wherein said linear guide member includes a guide portion having a longitudinally extending bore, and said guide rod is slidingly disposed within the bore in said guide member and through an aperture in said support frame.

13. The electro-shaker test stand of claim 10, wherein said lever arm includes a plurality of adjustment apertures for adjusting a length of said lever arm.

14. The electro-shaker test stand of claim 10 further comprising an adjustable link member interconnecting said lever arm with said electro-shaker mechanism.

15. The electro-shaker test stand of claim 10, wherein said spring table plate further comprises:

an upper spring table plate having an upper surface for supporting the vehicle and a lower surface with a guide member attached thereto;

a lower spring table plate having an upper surface and a lower surface, wherein said lower spring table plate is attached to said upper spring table plate, and is parallel to and spaced a predetermined distance from the upper spring table plate; and a track attached to an upper surface of said lower spring table plate, wherein said track includes a longitudinally extending channel for receiving the spring table guide member, to sliding adjust a position of said upper spring table plate with respect to said lower spring table plate when said vehicle is placed on said upper spring table plate.

16. The electro-shaker test stand of claim 10, wherein said spring is an extension spring.

17. An electro-shaker vehicle test stand for evaluation of a vehicle comprising:

a support frame formed by a plurality of interconnected support members, wherein said support frame has a boxlike shape;

an electro-shaker mechanism;

a fulcrum fixedly attached to said support frame, wherein said fulcrum is a generally planar member;

a lever arm disposed between said electro-shaker mechanism and said support frame, wherein said lever arm has an adjustable length, and a first end of said lever arm is connected to said electro-shaker mechanism and a second end of said lever arm is connected to said support frame utilizing a bracket, and said lever arm includes a plurality of adjustment apertures for adjusting a length of said lever arm;

a spring table having a spring table plate and a spring table frame that is parallel to and spaced a predetermined distance below said spring table plate, wherein said spring table plate includes an upper spring table plate having an upper surface for supporting the vehicle and a lower surface with a guide member attached thereto; and a lower spring table plate having an upper surface and a lower surface, such that said lower spring table plate is attached to said upper spring table plate, and is parallel to and spaced a predetermined distance from the upper spring table plate;

a track attached to an upper surface of said lower spring table plate, wherein said track includes a longitudinally extending channel for receiving the spring table guide member, to sliding adjust a position of said upper spring table plate with respect to said lower spring table plate when said vehicle is placed on said upper spring table plate;

a guide rod having a lower end attached to said spring table frame and an upper end attached to said spring table plate;

a linear guide member attached to a lower surface of said support frame plate, wherein said linear guide member includes a guide portion having a longitudinally extending bore, and said guide rod is slidingly disposed within the bore in said guide member and through an aperture in said support frame; and a spring having an upper end attached to said support frame and a lower end attached to said spring table frame, wherein activation of said electro-shaker mechanism induces an oscillatory movement of said spring in a vertical direction so that said spring table and vehicle are correspondingly displaced in a vertical direction.

18. The electro-shaker test stand of claim 17 wherein said support members include:

a center support column and a plurality of outer support columns;

a lower interconnecting support member interconnecting lower edges of said outer support columns;

an upper interconnecting support member interconnecting upper edges of said outer support columns; and a generally planar support frame plate positioned on top of said upper interconnecting support member.

19. The electro-shaker test stand of claim 17 further comprising an adjustable link member interconnecting said lever arm with said electro-shaker mechanism.

20. The electro-shaker test stand of claim 17, wherein said spring is an extension spring.

* * * * *